L. J. DEIBLE.
PICTURE ENLARGING DEVICE OR APPARATUS.
APPLICATION FILED FEB. 17, 1910.
984,359.
Patented Feb. 14, 1911.
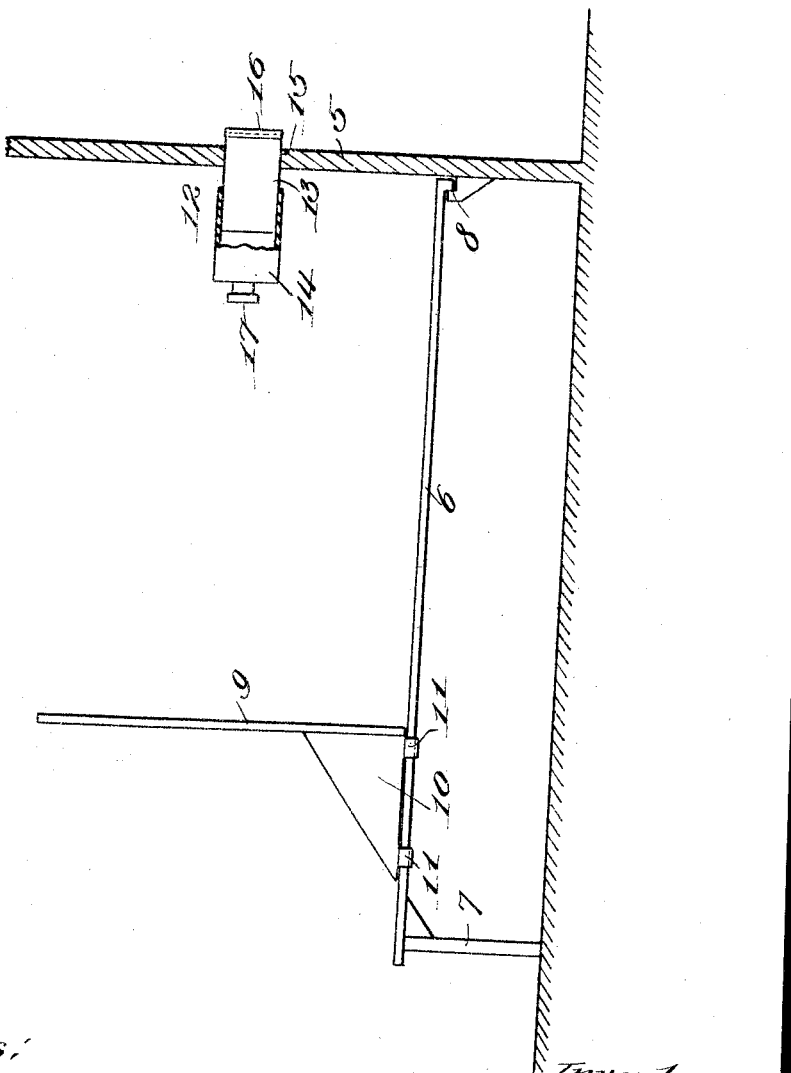

UNITED STATES PATENT OFFICE.

LEWIS J. DEIBLE, OF WARREN, PENNSYLVANIA, ASSIGNOR OF ONE-HALF TO FRANCIS W. STECK, OF WARREN, PENNSYLVANIA.

PICTURE-ENLARGING DEVICE OR APPARATUS.

984,359.  Specification of Letters Patent.  Patented Feb. 14, 1911.

Application filed February 17, 1910. Serial No. 544,354.

*To all whom it may concern:*

Be it known that I, LEWIS J. DEIBLE, a citizen of the United States, residing at Warren, in the county of Warren and State of Pennsylvania, have invented new and useful Improvements in Picture-Enlarging Devices or Apparatus, of which the following is a specification.

This invention relates to a picture enlarging device, and the primary object of the same is to provide a simple and effective means for enlarging pictures by daylight or artificial light, and which is of a portable nature and capable of being applied in operative position or fastened to a dark room wall and floor as may be desired to expose a negative holding means through the outside wall of the dark room.

A further object of the invention is to provide a simplified picture enlarging device or apparatus which is economical in the cost of manufacture and introduction.

With these and other objects and advantages in view the invention consists in the construction and arrangement of the several parts which will be more fully hereinafter specified.

The accompanying drawing illustrates a portion of a wall and floor of a dark room showing the improved picture enlarging device or apparatus applied thereto in operative position and partially broken away.

The numeral 5 indicates a wall which constitutes part of the inclosure of a photographer's dark room, and to the inner side thereof a bed 6 is rigidly connected and has at one end a supporting leg 7, the opposite end of the bed being attached to the wall 5, as at 8, by any suitable removable means. The bed 6, however, when secured to the wall within the dark room is maintained in rigid association relatively to the wall and is not extensible. The bed 6 is of such length as to accommodate a considerable range of adjustment or movement thereon of an upright screen 9 having a supporting bracket 10 with slide clips 11 engaging the edges of the bed, the said upright screen being freely shiftable on the bed to and from the wall 5 and adapted to support a sensitized means, such as photographers' sensitized paper, to receive an enlarged object or picture projected thereon. At a suitable elevation on the wall 5 a telescoping box camera 12 is supported and comprises a negative holding section 13 and a lens section 14 in which the section 13 is movably fitted. The outer or rear end of the negative holding section 13 is snugly inserted through an opening 15 in the wall 5 so that the negative holder 16 is exposed to the light outside of said wall or the dark room in which the enlarging device or apparatus is mainly disposed. The lens 17 disposed in the inner end of the lens section 14 is arranged in central alinement with relation to the screen 9. The box camera as a whole may be readily removed from the wall 5 to change negatives, and the enlargement of the negative may be accomplished either by daylight disposed on the outer exposed negative holding end of the section 13, or by artificial light, the only change necessary being the connection of the artificial light to the outer or rear extremity of the lens and negative holding section exteriorly of the dark room wall. By using a box camera of the class specified, the addition of supporting means is unnecessary as the box camera is self-supporting and the parts are reduced to a minimum.

The screen 9 is adjustable on the bed 6 to and from the camera and the lens section 14 of the latter is also adjustable on the section 13 while the latter is held fixed in the opening 15 with obvious advantages in picture enlarging and focusing operations.

In the operation of the device or apparatus, sensitized paper of any suitable or preferred kind is removably secured on the screen 9 and the latter then adjusted relatively to the camera as may be desired or found necessary. After a suitable adjustment of the camera has been made, the negative embodying the picture to be enlarged is inserted in the outer end of the camera or negative holding section and exposed to light exteriorly of the dark room in which the apparatus is disposed. After a suitable lapse of time the paper having the enlarged picture thereon is removed from the screen 9 and subjected to ordinary treatment. Any number of enlargements may be made from a single negative, or within a certain scale of enlargement the apparatus may be utilized without readjusting the camera or the screen. The negatives that are enlarged may be readily applied to and removed from the negative holding section of the camera from the exterior of the dark room without disturbing a particular adjustment of the screen and camera or subsequent to any change of adjustment that may be necessary in accordance with the character of the enlargement desired. It is obvious that the apparatus may also be used for reductions by properly arranging the lens carried by the section 14 or substituting a lens organization suitable for reducing pictures in place of the enlarging lens organization.

The improved device or apparatus will be found exceptionally convenient in its use and positive and expeditious in the performance of its functions, and changes in the proportions and dimensions may be adopted without departing from the spirit of the invention.

What is claimed is:

In a device of the class specified, the combination of an upright wall forming part of a dark room inclosure and having an opening therein at a suitable elevation, a bed having one end attached to said wall within the inclosure and the opposite end provided with supporting legs, the opening in the wall being above the bed, a screen adjustably mounted on the bed in line with the said opening in the wall, and a box camera comprising a negative holding section of the same contour in cross-section as the opening in the wall and inserted in said opening and having its outer end exposed exteriorly of said wall, and a lens section adjustably mounted on the negative holding section within the dark room inclosure, the negative holding section serving as the sole supporting means for the entire camera relatively to the wall and the sections of the camera simultaneously removable from the wall from the interior of the inclosure.

In testimony whereof I have hereunto set my hand in presence of two subscribing witnesses.

LEWIS J. DEIBLE.

Witnesses:
RICHARD H. SCHULER,
GEORGE O. CORNELIUS.